(12) United States Patent
Lee et al.

(10) Patent No.: US 12,441,085 B2
(45) Date of Patent: Oct. 14, 2025

(54) THIN GLASS-LAMINATED PRINTED STEEL SHEET HAVING EXCELLENT SURFACE QUALITY AND METHOD FOR MANUFACTURING SAME

(71) Applicants: POSCO, Pohang-si (KR); CORNING INCORPORATED, Corning, NY (US)

(72) Inventors: Jung-Hwan Lee, Gwangyang-si (KR); Jae-Seon Hong, Asan-si (KR); Jin-Tae Kim, Gwangyang-si (KR); Joon-Soo Kim, Asan-si (KR); Bum-Gook Lee, Asan-si (KR); Tae-Hyo Park, Asan-si (KR); Myung-Soo Kim, Gwangyang-si (KR)

(73) Assignees: POSCO CO., LTD, Pohang-si (KR); CORNING INCORPORATED, Corning, NY (US)

( * ) Notice: Subject to any disclaimer, the term of this patent is extended or adjusted under 35 U.S.C. 154(b) by 671 days.

(21) Appl. No.: 17/414,735

(22) PCT Filed: Dec. 18, 2019

(86) PCT No.: PCT/KR2019/017990
§ 371 (c)(1),
(2) Date: Jun. 16, 2021

(87) PCT Pub. No.: WO2020/130621
PCT Pub. Date: Jun. 25, 2020

(65) Prior Publication Data
US 2022/0040958 A1    Feb. 10, 2022

(30) Foreign Application Priority Data

Dec. 19, 2018  (KR) .................. 10-2018-0165622
Oct. 18, 2019  (KR) .................. 10-2019-0129600

(51) Int. Cl.
*B32B 17/06* (2006.01)
*B32B 7/12* (2006.01)
(Continued)

(52) U.S. Cl.
CPC ............ *B32B 17/061* (2013.01); *B32B 7/12* (2013.01); *B32B 15/18* (2013.01); *B32B 37/003* (2013.01);
(Continued)

(58) Field of Classification Search
None
See application file for complete search history.

(56) References Cited

U.S. PATENT DOCUMENTS 6,491,373 B1 *  12/2002  Fujita .................. H04N 1/4051
                                                    347/41
2004/0069770 A1  4/2004  Cary et al.
(Continued)

FOREIGN PATENT DOCUMENTS

CN  101879838     11/2010
CN  103457367 A   12/2013
(Continued)

OTHER PUBLICATIONS

European Search Report—European Application No. 19898470.0 issued on Jan. 17, 2022, citing KR 10-2009-0090478, US 2004/069770, KR 10-2017-0075932, and KR 10-1403986.
(Continued)

*Primary Examiner* — Kim S. Horger
(74) *Attorney, Agent, or Firm* — CANTOR COLBURN LLP

(57) ABSTRACT

Provided is a thin glass-laminated printed steel sheet comprising: a printed steel sheet including a metal sheet and a printed layer on which a design or a pattern having a high resolution of 300 dpi or higher is printed on a surface of the
(Continued)

metal sheet; an adhesive layer formed by curing an ultraviolet curable adhesive solution on the printed steel sheet, having a thickness of 10 to 100 µm, and being transparent; and a flexible thin glass attached by the adhesive layer, wherein a reference value for color density ($D_{max}$ Comparison) is higher than 1.6, as measured by a spectrophotometer.

14 Claims, 5 Drawing Sheets

(51) Int. Cl.
  *B32B 15/18* (2006.01)
  *B32B 37/00* (2006.01)
  *B32B 37/12* (2006.01)
  *B32B 38/00* (2006.01)

(52) U.S. Cl.
  CPC ............ *B32B 37/12* (2013.01); *B32B 38/145* (2013.01); *B32B 2037/1253* (2013.01); *B32B 2250/02* (2013.01); *B32B 2255/06* (2013.01); *B32B 2307/4023* (2013.01); *B32B 2307/406* (2013.01); *B32B 2307/412* (2013.01); *B32B 2307/732* (2013.01); *B32B 2309/105* (2013.01); *B32B 2309/12* (2013.01); *B32B 2310/0831* (2013.01); *B32B 2311/30* (2013.01); *B32B 2315/08* (2013.01)

(56) References Cited

U.S. PATENT DOCUMENTS

| | | | |
|---|---|---|---|
| 2010/0310887 | A1 | 12/2010 | Kim et al. |
| 2014/0014260 | A1 | 1/2014 | Chowdhury et al. |
| 2016/0083282 | A1 | 3/2016 | Jouanno et al. |
| 2017/0354991 | A1 | 12/2017 | Kim et al. |
| 2018/0194978 | A1* | 7/2018 | Dollase ................... C09J 153/00 |
| 2018/0230323 | A1* | 8/2018 | Kim ....................... C09D 11/30 |

FOREIGN PATENT DOCUMENTS

| | | |
|---|---|---|
| CN | 107107100 A | 8/2017 |
| CN | 108603061 | 9/2018 |
| EP | 4074504 A1 | 10/2022 |
| JP | 2001071417 | 3/2001 |
| JP | 2004202971 | 7/2004 |
| JP | 2009248466 | 10/2009 |
| JP | 2009248466 A * | 10/2009 |
| JP | 6054528 B2 | 12/2016 |
| JP | 2018532001 A | 11/2018 |
| KR | 100177897 | 4/1999 |
| KR | 20030044723 | 6/2003 |
| KR | 20090090478 | 8/2009 |
| KR | 20110086912 | 8/2011 |
| KR | 20130073545 | 7/2013 |
| KR | 101403986 | 6/2014 |
| KR | 20160003706 | 1/2016 |
| KR | 20170017543 | 2/2017 |
| KR | 20170075932 | 7/2017 |
| KR | 101911718 | 10/2018 |
| WO | 2018221326 | 12/2018 |

OTHER PUBLICATIONS

International Search Report—PCT/KR2019/017990 dated Apr. 29, 2020.
Chinese Office Action—Chinese Application No. 201980085149.5 issued on Sep. 2, 2022, citing US 2004/0069770, CN 108603061, JP 2004-202971, CN 101879838, KR 10-2013-0073545, JP 2001-071417, KR 10-1403986, KR 10-2017-0075932, and KR 10-2009-0090478.
European Office Action—European Application No. 19898470.0 issued on Feb. 17, 2025, citing KR 2009 0090478, US 2004/069770, KR 2017-0075932, KR 10-1403986, and EP 4074504.
Japanese Office Action—Japanese Application No. 2021-535729 issued on Jun. 3, 2025, JP 2018-532001 A, and US 2004/0069770 A1.
Chinese Office Action—Chinese Application No. 202311335187.6 issued on Jul. 10, 2025, citing US 2004/0069770, CN 103457367 and CN 107107100.

* cited by examiner (a)

(b)

(c)

(d)

(a)

(b)

(c)

THIN GLASS-LAMINATED PRINTED STEEL SHEET HAVING EXCELLENT SURFACE QUALITY AND METHOD FOR MANUFACTURING SAME

CROSS-REFERENCE TO RELATED APPLICATIONS

This application is a national entry of PCT Application No. PCT/KR2019/017990 filed on Dec. 18, 2019, which claims priority to and the benefit of Korean Application Nos. 10-2018-0165622 filed on Dec. 19, 2018 and 10-2019-0129600 filed on Oct. 18, 2019, in the Korean Patent Office, the entire contents of which are incorporated herein by reference.

TECHNICAL FIELD

The present disclosure relates to a thin glass-laminated printed steel sheet in which transparent and flexible thin glass is laminated to an inkjet-printed metal steel sheet on which patterns, images, shapes, or the like, including various designs having high resolution are printed.

BACKGROUND ART

In general, a surface-treated steel sheet on which a shape is printed may be used for exteriors of buildings, exteriors of home appliances, or the like, and may be used by controlling gloss through various clear coatings. Such a printed steel sheet may be used to increase an aesthetic effect of a desired product or an interior effect of a building by having a design including various images and shapes on a surface thereof.

As quality of life gradually increases, consumers may consider not only functions of a product, but also appearance or design of the product as an important factor in choosing a product when purchasing home appliances, building materials, or the like. In response to the demands of such consumers, in recent years, a color steel sheet coated with one color, a printed steel sheet having a texture together with an attractive appearance by implementing various shapes using ink, or the like, has emerged as a trend. As above, such a color steel sheet and printed steel sheet with excellent visual function of appearance on a surface thereof may be widely applied to fire doors, elevator interiors, high-end buildings, indoor interiors, home appliances, kitchens, furniture, or the like, in accordance with individualization and high-quality. In particular, demand for printed steel sheets is gradually increasing because printed steel sheets may have a variety of designs required by consumers applied thereto and may have high-resolution and high-quality designs.

Conventionally, a printed steel sheet containing a shape on a steel sheet may be prevented from damaging a printed shape by finally applying a transparent coating layer to the design printing layer, and a printed shape layer may be made more prominent through such a transparent coating layer. However, in the clear coating method for a single sheet of the current sheet method, some high gloss may be achieved by using silk screen, curtain coating, or the like, but a thickness of the transparent coating layer may be relatively thick, such as 50 to 100 μm, and roughness may be generated on a surface thereof due to volatilization of a solvent, making it difficult to realize an attractive surface. In addition, since along curing time for natural flattening for surface smoothness is required, productivity may be inferior, and it is very vulnerable to fire or the like. In particular, there may be a limit to exhibiting surface characteristics of high gloss, high hardness, and high image clarity, similarly to a glass surface, required by the customer, surface roughness thereof may be high, thereby not realizing high image clarity, and attractive surface qualities such as high surface hardness, high gloss, or the like may not be realized.

DISCLOSURE

Technical Problem

The present disclosure has been proposed in order to solve the above-described conventional problems, and an aspect of the present disclosure is to provide a thin glass-laminated printed steel sheet having excellent surface qualities, such as high hardness, high gloss, and high image clarity, and a method for manufacturing the same.

A subject of the present disclosure is not limited to the above description. Those of ordinary skill in the art to which the present disclosure pertains will not have any difficulty in understanding additional subjects of the present disclosure from the general details of the present specification.

Technical Solution

According to an aspect of the present disclosure, a thin glass-laminated printed steel sheet includes a printed steel sheet including a metal sheet and a printed layer on which a design or a pattern is printed on a surface of the metal sheet; an adhesive layer formed by curing an ultraviolet curable adhesive solution on the printed steel sheet, having a thickness of 10 to 100 μm, and being transparent; and flexible thin glass attached by the adhesive layer, wherein a reference value for color density ($D_{max}$ Comparison) is higher than 1.6, as measured by a spectrophotometer.

A thickness of the flexible thin glass may be 0.1 to 2 mm.

Glossiness of the thin glass-laminated printed steel sheet may be 85% or more, based on a 60 degree glossmeter.

Image clarity of the thin glass-laminated printed steel sheet may be SW 30 or less and LW 10 or less, based on an image clarity measuring instrument.

In evaluating optical properties by the spectrophotometer, an L value may be greater than 75, when a white point is evaluated (White Point Comparison), a reference value is greater than 440,000, when a HSL (H: Hue, S: Saturation, L: Lightness) value may be evaluated for color gamut volume (Gamut Volume) (HSL Comparison), based on maximum saturation (Saturation=1), and a reference value may be greater than 200,000, when an absolute value of color gamut volume is evaluated (Cubic Volume Comparison).

The flexible thin glass may be non-alkali borosilicate glass, soda lime glass, or tempered glass.

The printed steel sheet may further include at least one or more of a base color layer or a primer layer, between the metal sheet and the printed layer.

A pretreatment layer may be further included between the metal sheet and the primer layer.

The printed steel sheet may be an inkjet-printed steel sheet.

Resolution of the design or the pattern printed on the printed layer may be 300 dpi or higher.

According to another aspect of the present disclosure, a method for manufacturing a thin glass-laminated printed steel sheet, includes preparing a printed steel sheet including a metal sheet and a printed layer on which a design or a pattern is printed on a surface of the metal sheet; applying an ultraviolet curable adhesive solution to a surface of the prepared printed steel sheet to form an adhesive layer;

attaching flexible thin glass to the prepared printed steel sheet to which the ultraviolet curable adhesive solution is applied; applying pressure to the attached flexible thin glass; and irradiating ultraviolet rays to cure the ultraviolet curable adhesive solution.

A thickness of the flexible thin glass may be 0.1 to 2 mm.

In the applying pressure, the pressure may be 2 to 10 kgf.

A thickness of the adhesive layer, after curing the ultraviolet curable adhesive solution, may be 10 to 100 µm.

The ultraviolet curable adhesive solution may include a polyester acrylate oligomer having six or more functional groups, a urethane acrylate oligomer having two functional groups, at least one photocurable monomer, and a photoinitiator.

Resolution of the design or the pattern printed on the printed layer may be 300 dpi or more.

According to another aspect of the present disclosure, a system for manufacturing a thin glass-laminated printed steel sheet, includes a coating means coating an ultraviolet curable adhesive solution on a printed steel sheet; a glass attaching means installed on a rear end of the coating means and attaching flexible thin glass onto the adhesive solution; a pressing means connected to the glass attaching means and compressing the flexible thin glass to make the glass attaching means and the flexible thin glass in close contact with each other; and a curing means installed on a rear end of the pressing means and irradiating ultraviolet rays to cure the ultraviolet curable adhesive solution to form a coating film.

A decompression means decompressing the thin glass-laminated printed steel sheet to remove microbubbles in an edge portion of the thin glass-laminated printed steel sheet may be further included.

Advantageous Effects

According to an aspect of the present disclosure, a thin glass-laminated printed steel sheet having excellent surface qualities and good optical properties, such as high hardness, high gloss, and high image clarity, by laminating thin glass having a small roughness on a printed steel sheet, to realize various images of the printed steel sheet with high image clarity, and to prevent discoloration, detachment, or the like as well as protecting the printed layer.

Various advantages and effects of the present disclosure are not limited to the above-described contents, and can be more easily understood in the process of describing specific embodiments of the present disclosure.

BEST MODE FOR INVENTION

Hereinafter, preferred embodiments of the present disclosure will be described. However, embodiments of the present disclosure may be modified to have various other forms, and the scope of the present disclosure is not limited to embodiments described below. In addition, embodiments of the present disclosure may be provided in order to more completely explain the present disclosure to those having average knowledge in the art.

[Thin Glass-Laminated Printed Steel Sheet]

Figure 1:
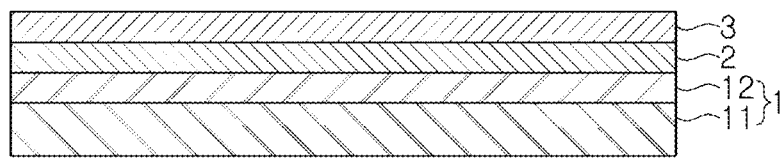
FIG. 1 illustrates a structure of a thin glass-laminated printed steel sheet according to an aspect of the present disclosure.

FIG. 1 schematically illustrates a structure of a thin glass-laminated printed steel sheet according to an aspect of the present disclosure. Referring to FIG. 1, a thin glass-laminated printed steel sheet according to an aspect of the present disclosure may include a printed steel sheet 1 including a metal sheet 11 and a printed layer 12 on which a design or a pattern is printed on a surface of the metal sheet; an adhesive layer 2 formed by curing an ultraviolet curable adhesive solution on the printed steel sheet 1, having a thickness of 10 to 100 µm, and being transparent; and flexible thin glass 3 attached by the adhesive layer 2.

Printed Steel Sheet

A printed steel sheet 1 of a thin glass-laminated printed steel sheet according to an aspect of the present disclosure is not particularly limited, and may be applied to the present disclosure as long as it may be a currently manufactured or commercially available printed steel sheet. In addition, the printed steel sheet 1 may include a metal sheet 11 and a printed layer 12 on which a design or a pattern is printed on a surface of the metal sheet. Although not limited thereto, as an embodiment, resolution of the design or the pattern may be a high resolution of 300 dpi or higher.

As a non-limiting embodiment, the printed steel sheet 1 may be an inkjet-printed steel sheet. When printing a design or a pattern by inkjet printing, it may be easy to print a high-resolution full color of 300 dpi or more. Therefore, a fine difference in contrast, brilliant saturation, and realistic color may be realized. In addition, according to the present disclosure, when the thin glass 3 is in contact with the inkjet-printed steel sheet, a surface appearance may be realized, similarly to that of a real natural material. Therefore, an attractive decorative material may be obtained.

Figure 2:
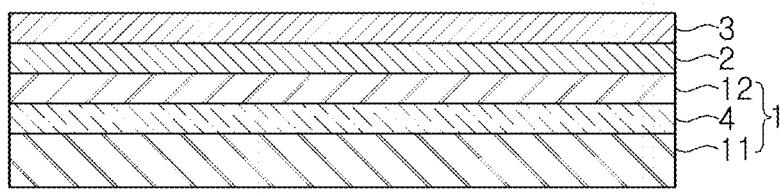
FIG. 2 is a view illustrating various modified embodiments of a thin glass-laminated printed steel sheet according to an aspect of the present disclosure. Portions (a) to (c) are modified embodiments in which a base color layer and/or a primer layer are formed between a metal sheet and a printed layer, and portion (d) is a modified embodiment in which a base color layer, a primer layer, and a pretreatment layer are formed between a metal sheet and a printed layer.
Figure 2:
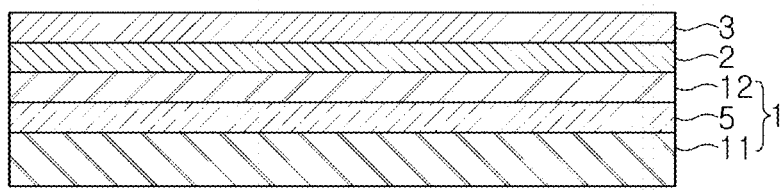
Figure 2:
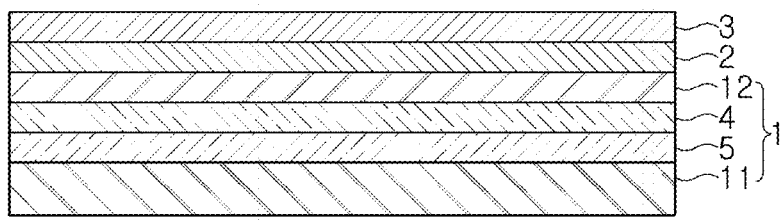
Figure 2:
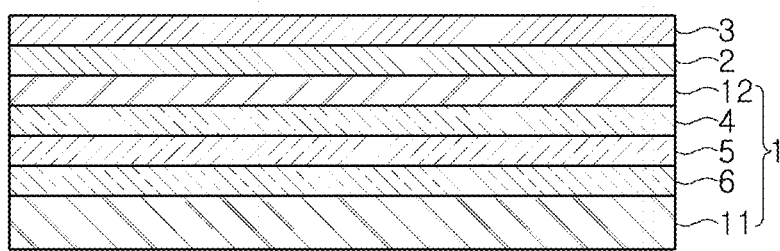

As a non-limiting modified embodiment, the printed steel sheet 1 may include a base color layer 4 and/or a primer layer 5 between the metal sheet 11 and the printed layer 12. In FIG. 2, portions (a) to (c) illustrate structures of thin glass-laminated printed steel sheets according to the above modified embodiment. The base color layer 4 may serve to express a base color of the printed steel sheet 1, and a thickness thereof may be 5 to 30 µm. In addition, plasma treatment may be performed on the base color layer 4 in order to adhere to the printed layer 12. The primer layer 5 may serve to enhance adhesion between the metal sheet 11 and the base color layer 4 or adhesion between the metal sheet 11 and the printed layer 12, and a thickness thereof may be 1 to 10 µm.

In addition, as another non-limiting modified embodiment, a pretreatment layer 6 may be further included between the metal sheet 11 and the primer layer 5. In FIG.

2, portion (d) illustrates a structure of a modified embodiment in which the pretreatment layer 6 is further included. The pretreatment layer 6 may serve to improve basic corrosion resistance of the metal sheet 11, and improve adhesion between the metal sheet 11 and the primer layer 5, and a thickness thereof may be 0.1 to 2 μm.

Adhesive Layer

On the printed layer 12 of the printed steel sheet 1, an adhesive layer 2 for laminating on the thin glass 3 and being transparent may be formed, and the adhesive layer 2 may be formed by applying an ultraviolet curable adhesive solution on the printed steel sheet 1 and then curing the same by UV curing.

Figure 3:
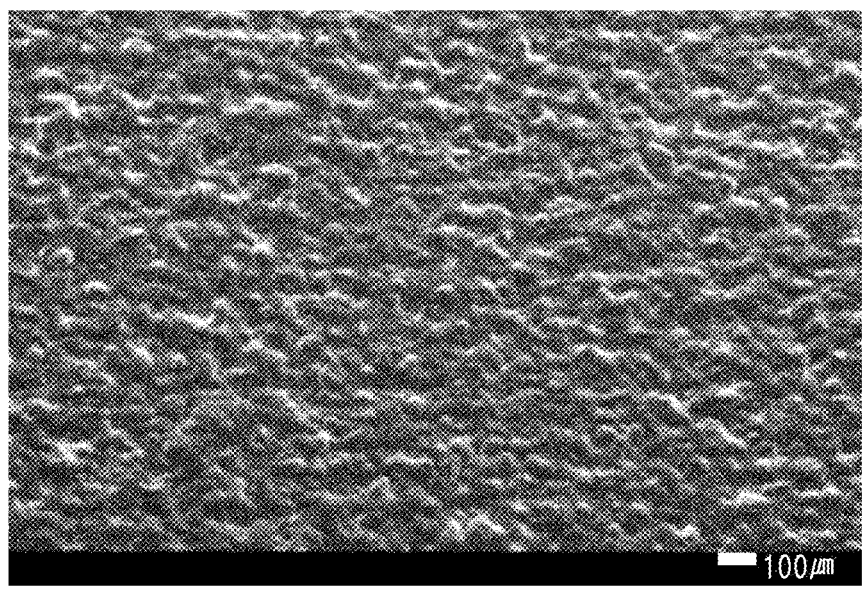
FIG. 3 is a photograph of a surface condition of an inkjet-printed steel sheet, observed by a scanning electron microscope (SEM).
Figure 4:
FIG. 4 is a view illustrating various embodiments of an adhesive layer. Portion (a) is a case in which a film adhesive is used, and portion (b) is a case in which a thermosetting adhesive is used. Portion (c) is a case in which an ultraviolet curable adhesive solution is used according to the present disclosure.
Figure 4:
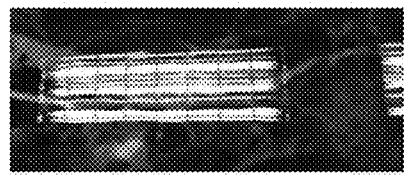
Figure 4:
Figure 4:
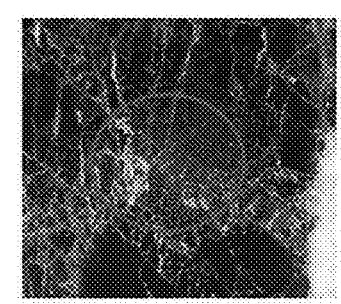
Figure 4:
Figure 4:
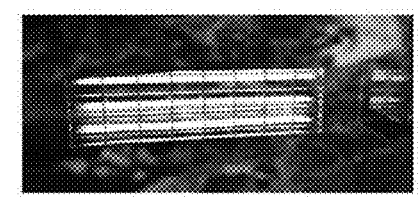
Figure 5:
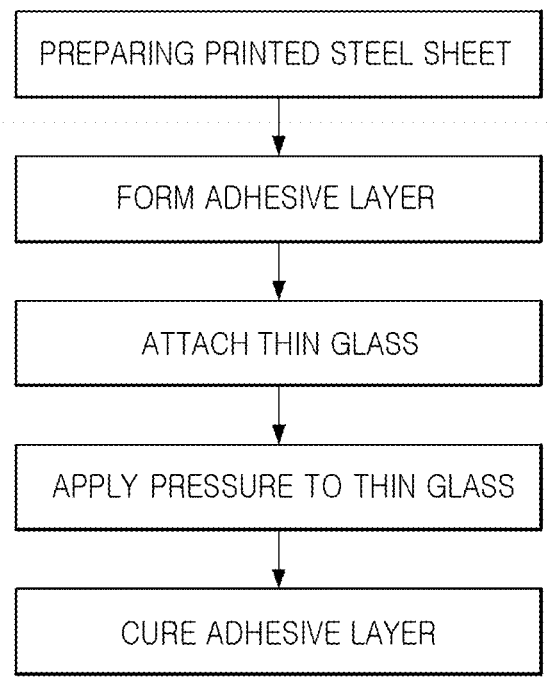
FIG. 5 is a view schematically illustrating a method of manufacturing a thin glass-laminated printed steel sheet according to another aspect of the present disclosure.

First, the adhesive layer 2 may be formed of an ultraviolet curable adhesive solution. In the prior art, film adhesives or thermosetting adhesives were generally used when laminating glass to building materials. However, as can be seen in FIG. 3, since the printed steel sheet 1, especially the inkjet-printed steel sheet, has a surface roughness of several to several tens of μm, when a film adhesive or a thermosetting adhesive is used for the printed steel sheet 1, attractive surface image clarity and flatness may not be obtained. In more detail with reference to FIG. 4, in a film adhesive of portion (a) in FIG. 4, a specific surface roughness due to ink droplets may be transferred to an adhesive film and glass as it is, resulting in bending. Therefore, poor surface flatness may occur. In addition, in a thermosetting adhesive of portion (b) in FIG. 4, a solvent may be usually included in an adhesive coat. As shown in a photograph on the right (refer to the red circle) of the portion (b) in FIG. 4. There may be a problem in that such a solvent may be vaporized, may not be escaped, and may remain in the adhesive film, to generate air bubbles. Therefore, in order not to transfer the surface roughness of the printed steel sheet to the glass, or to minimize the occurrence of air bubbles, a solution type adhesive may be more suitable, compared to a solid type film adhesive, and better surface quality characteristics may be obtained when using an ultraviolet curing adhesive solution, compared to a thermosetting adhesive.

It is preferable that the adhesive layer 2 has excellent transparent properties since an image of the printed steel sheet should be transmitted and viewed as it is. Specifically, the adhesive layer 2 may have a high transmittance of about 85% or more in a 550 nm wavelength band, and may also have a yellowness index of 2 or less.

The adhesive layer 2 may be formed to have a thickness of 10 to 100 μm. When a thickness of the adhesive layer 2 is less than 10 μm, roughness of the inkjet-printed surface (the printed layer) may not be offset, and thus a problem of surface quality, e.g., a problem of image clarity may occur. When a thickness of the adhesive layer 2 exceeds 100 μm, there may be problems that a thickness of the adhesive layer 2 becomes too thick, resulting in problems of color realization performance or curing efficiency, and, in addition, a relatively large amount of adhesive solution may be used to increase manufacturing costs.

Flexible Thin Glass

Flexible thin glass 3 having a thickness of 0.1 to 2 mm may be laminated to the transparent adhesive layer 2. A material of the thin glass 3 is not particularly limited, but non-alkali borosilicate glass, soda lime glass, or tempered glass may be applied as a non-limiting embodiment.

The thin glass 3 should be freely flexible, and a thin one (i.e., a thin plate) having a thickness of 0.1 to 2 mm may be used. Unlike the existing thick glass, there may be advantages that the flexible thin glass 3 may be laminated to the printed steel sheet, and may be light in weight and excellent in light transmittance. In addition, due to flexible properties thereof, even after glass is attached, a feature that may be rounded may be obtained. When a thickness of the thin glass 3 is less than 0.1 mm, there may be problems that handling may be difficult and flatness may be lowered due to curvature of a surface or external force in laminating the glass. When a thickness of the thin glass 3 exceeds 2 mm, a thickness of the thin glass may become thick, whereby a pressure may not be properly transmitted, or weight of the thin glass may become heavy, thereby not being economically viable.

In particular, the thin glass 3, applied to the present disclosure, should be capable of transmitting ultraviolet rays and radiation in a visible wavelength band as well as a wavelength band, lower than the visible wavelength band. In the present disclosure, the metal sheet and the thin glass may be laminated by the adhesive layer 2, and the adhesive layer 2 may be cured bypassing through an ultraviolet or radiation curing machine.

A thin glass-laminated printed steel sheet according to the present disclosure having the above-described configuration may have a glossiness of 85% or more, based on a 60 degree glossmeter, and an image clarity of SW 30 or less and LW 10 or less, based on an image clarity measuring instrument. In addition, surface hardness thereof may be 9H or more, based on pencil hardness.

As an optical characteristic evaluated by measuring light in a 376.76 to 730 nm region using a spectrophotometer, an L value may be 75 or more, when white point is evaluated (White Point Comparison), a reference value may be greater than 440,000, when a HSL (H: Hue, S: Saturation, L: Lightness) value is evaluated for color gamut volume (Gamut Volume) (HSL Comparison), based on maximum saturation (Saturation=1), a reference value for color density ($D_{max}$ Comparison) may be higher than 1.6, and a reference value may be greater than 200,000, when an absolute value of color gamut volume is evaluated (Cubic Volume Comparison). In particular, the present disclosure is characterized in that since the reference value may exceed 1.6 when evaluating the color density, a high-resolution image of the printed steel sheet may be realized at a real-life level, even though the thin glass and the adhesive layer are formed.

In particular, evaluation for optical properties may be performed under the following conditions. Although not limited thereto, it may be determined that the scope of the present disclosure is satisfied when the above criteria are satisfied in evaluating optical properties according to the following conditions.

A 3×X-rite i1Pro 2 Spectrophotometer was used for the optical characteristic evaluation, and, in particular, was measured under the conditions of D50M2 uv compensation mode (2 degree Standard Observer by CIE 1931), spectral spacing (3.3 nm), spectral bands (107), spectral start (376.67 nm), and spectral end (730 nm). In addition, ArgyllCMS 2.0.1 was used as a software for measurement thereof, and, in particular, was measured under the conditions of single channel step (8), gray axis step (32), and sampling color patches (882). As a software for analysis thereof, Gamut-Vision, Color ThinkPro, and Raw data Direct Analysis were used to evaluate absolute values of white point, color gamut volume, color density, and gamut volume.

In a thin glass-laminated printed steel sheet according to an aspect of the present disclosure, since thin glass 3 may be laminated on a high-resolution printed steel sheet 1, high hardness, high image clarity, fouling resistance, and chemical resistance according to glass characteristics may be implemented, and since thin glass may be used, excellent color and good interfacial adhesion may be realized at the same time.

Hereinafter, a method of manufacturing a thin glass-laminated printed steel sheet according to another aspect of the present disclosure will be described in detail.

[Method of manufacturing Thin Glass-Laminated Printed Steel Sheet]

A method for manufacturing a thin glass-laminated printed steel sheet according to another aspect of the present disclosure may include preparing a printed steel sheet 1; applying an ultraviolet curable adhesive solution to a surface of the prepared printed steel sheet 1 to form an adhesive layer 12; attaching thin glass 3 to the prepared printed steel sheet to which the ultraviolet curable adhesive solution is applied; applying pressure to the attached thin glass to remove air bubbles formed between the ultraviolet curable adhesive solution and the thin glass 3; and irradiating ultraviolet rays to cure the ultraviolet curable adhesive solution.

Preparation of Printed Steel Sheet and Formation of Adhesive Layer

First, a printed steel sheet 1 having a metal sheet 11 and on which various designs of high resolution are printed may be prepared, and a transparent ultraviolet curable adhesive solution may be applied on the printed steel sheet 1. As a method of applying the ultraviolet curable adhesive solution, the ultraviolet curable adhesive solution may be applied using a separate application device such as a roll coating means or a slot knife, or may be manually applied by an operator with equipment such as a brush or a spray gun. However, the present disclosure is not limited thereto, and any of the conventionally known means may be used as long as it is a means capable of evenly applying the adhesive solution to the printed steel sheet.

The ultraviolet curable adhesive solution may be applied to the present disclosure as long as it is cured by ultraviolet rays and an adhesive having adhesive strength. An adhesive solution capable of being cured by radiation may be also used. As a non-limiting embodiment, the ultraviolet curable adhesive solution may include a polyester acrylate oligomer having six or more functional groups, a urethane acrylate oligomer having two functional groups, at least one photocurable monomer, a photoinitiator, and other additives. Examples of the photocurable monomer may include TMPTA, THFA, PETA, and IBOA, and examples of the photoinitiator may include 2-hydroxy-2-methyl-1-phenyl-propane, oxy-phenyl-acetic acid 2-[2oxo-2phenyl-acetoxy-ethoxy]-ethyl ester. In addition, as the other additives, phosphoric acid acrylate (acid value 250), polyether siloxane compound, and fluoroalkyl compound may be included.

The ultraviolet curable adhesive solution should be evenly applied to an entire region of the printed steel sheet 1. For this purpose, the ultraviolet curable adhesive solution may be preferably applied in a certain thickness thereof to the entire region of the printed steel sheet, and may be more preferably applied in a certain amount thereof at certain intervals. When applied at certain intervals, the adhesive solution may be spread evenly over the entire region of the printed steel sheet due to pressure by attaching and compressing the thin glass 3. Therefore, waste of the adhesive solution may be minimized.

In addition, when applying the ultraviolet curable adhesive solution, a roll or bed capable of supporting the printed steel sheet 1 may be configured. Ina coiled steel sheet, a roll made of rubber or metal may be provided, and in a sheet material, a bed made of plastic, metal, or wood may be provided to support an entire surface of the sheet material. When applying the ultraviolet curable adhesive solution on such a roll or bed, it may be applied more easily and evenly.

Attachment and Application of Pressure to Thin Glass

After applying the ultraviolet curable adhesive solution on the printed steel sheet 1, flexible thin glass 3 having a thickness of 0.1 to 2 mm may be attached thereon. And, after attaching the thin glass 3, the thin glass 3 may be pressed by applying a pressure of 2 to 10 kgf. An appropriate pressure may be applied to the thin glass 3, a thickness of the adhesive layer 2 may be appropriately adjusted, and air bubbles formed in the ultraviolet curable adhesive solution and on the thin glass 3 may be easily removed.

When pressure applied to the thin glass 3 is less than 2 kgf, air bubbles remaining at the adhesive interface may be trapped due to pressure drop, or the pressure may not be transmitted as a whole, resulting in a defect in which an unattached portion occurs between the thin glass and the adhesive layer. When the pressure exceeds 10 kgf, a thickness of the adhesive layer 2 may decrease due to high pressure, so that the rough surface of the printed layer may be adhered as it is, resulting in poor image quality, and the adhesive solution may escape out and cause fouling of a device. Therefore, the pressure may be controlled to 2 to 10 kgf.

A method of applying pressure may be applied without limitation to the present disclosure as long as it may be a glass pressing method conventionally used. As a non-limiting embodiment, it may be compressed by a roll press method in which pressure is applied using a lamination roll (a press roll) located on upper and lower surfaces of the printed steel sheet 1. In addition, as a non-limiting embodiment, an attaching means and a pressing means, used in the attachment and application of pressure to the thin glass, may include a roll press including a lamination roll provided to be located on the upper and lower surfaces of the printed steel sheet 1; a thin glass withdrawal means provided on an upper side of the roll press; and a member provided between the thin glass 3 and the printed steel sheet 1 on which the adhesive layer 2 is formed to support the thin glass 3 in a flat state.

The lamination roll may be made of a roll made of a rubber material, and may perform compression while moving using a conveyor belt to move the lamination roll in a longitudinal direction of a base material (the steel sheet), when pressing between the printed steel sheet and the thin glass. In addition, the laminated roll may include a lifting actuator and a pressure adjusting device, for controlling lifting height and pressure to adjust a thickness of the adhesive layer applied to the printed steel sheet. In addition, the member may be provided at a corner of the thin glass in a width direction to keep the thin glass in a flat state. The member may be provided with a conveyor belt or a roller, but is not limited thereto, and any means capable of maintaining the transparent thin glass may be used.

Curing of Adhesive Layer

Thereafter, the pressed thin glass-laminated printed steel sheet may be passed through an ultraviolet curing means to cure the ultraviolet curable adhesive solution, thereby forming a coating film having a thickness of 10 to 100 μm. In this case, the irradiated ultraviolet rays may be in a wavelength range of 300 to 400 nm. However, the present disclosure is not limited thereto, and any of the conventionally known means may be applied without limitation as long as it may be a means capable of curing the ultraviolet curable adhesive solution.

In addition, during ultraviolet curing, microbubbles in an edge portion thereof may be removed using a decompression means such as a pressure reducer or the like.

[System for laminating Printed Steel Sheet and Thin Glass]

A system for laminating a printed steel sheet and thin glass, according to another aspect of the present disclosure, may include a coating means coating an ultraviolet curable adhesive solution on a printed steel sheet; a glass attaching means installed on a rear end of the coating means and attaching thin glass onto the adhesive solution; a pressing means connected to the glass attaching means and compressing a glass film to make the glass attaching means and the glass film in close contact with each other; and a curing means installed on a rear end of the pressing means and irradiating ultraviolet rays to cure the ultraviolet curable adhesive solution to form a coating film. In addition, as necessary, a decompression means decompressing the thin glass-laminated printed steel sheet to remove microbubbles in an edge portion of the thin glass-laminated printed steel sheet may be included.

MODE FOR INVENTION

Hereinafter, the present disclosure will be described in more detail through examples. However, it should be noted that the following examples may be for illustrative purposes only and may not be intended to limit the scope of the present disclosure. This is because the scope of the present disclosure may be determined by matters described in the claims and matters reasonably inferred therefrom.

EXAMPLE

First, as Inventive Example, a urethane acrylate-based ultraviolet curable coating solution contained in a coater pan was applied to a coating roll, a transparent adhesive solution was applied to have a thickness of 30 to 40 μm on an inkjet-printed steel sheet printed with a high resolution shape (resolution: 1200 dpi) and having a thickness of 1 mm, and a thin glass having a thickness of 400 μm and a light transmittance of 90% or more was attached thereon. Thereafter, a film was pressed with a pressure of 3 kg/f using a pressing roll to contact a coating solution and the film, and passed through an ultraviolet curing machine to cure and adhere the adhesive solution, to prepare a glass-laminated steel sheet.

As Comparative Example 1, a high-gloss transparent coating solution was applied on an inkjet-printed steel sheet printed with a high resolution shape and having a thickness of 1 mm, and a coating film was formed by a thermal curing method. In addition, as Comparative Example 2, the same transparent adhesive solution was applied to have a thickness of 30 to 40 μm on the same inkjet-printed steel sheet, 5 mm thick tempered glass having a light transmittance of 90% or more was attached thereto, and then cured by passing through an ultraviolet curing machine, to prepare a glass-laminated steel sheet.

[Evaluation for Glossiness, Image Clarity, and Hardness]

Glossiness, image clarity, and hardness were tested according to the following measurement methods for products manufactured according to the Inventive Example and the Comparative Examples, and the results therefrom were illustrated in Table 1 below.

Measurement of Glossiness

Glossiness was measured at a measurement angle of 60° using a glossmeter (BYK-Gardner). Glossiness was expressed as a relative value, based on a reflectance of glass as 100.

Measurement of Image Clarity

Image clarity was classified and marked with a grade of 0 (good) to 100 (bad) by irradiating light at an angle of 20° on a surface of a 1 cm×10 cm specimen using a image clarity measuring device (Wavescan, BYK-Gardner), and scanning 3750 points to determine degrees of unevenness and image clarity of the coating film. At this time, a measurement ranged was divided into a short wave (SW) of 0.1 to 1.2 mm and a long wave (LW) of 1.2 to 12 mm, and measurement thereof was performed.

In Table 1 below, when measured values of image clarity are SW 20 or less and LW 5 or less, "⊚" was marked; when measured values of image clarity are SW 21 to 30 and LW 6 to 15, "o" was marked; when measured values of image clarity are SW 31 to 40 and LW 16 to 20, "Δ" was marked; and, when measured values of image clarity are SW 41 or more and LW 21 or more, "x" was marked.

Measurement of Hardness

Hardness was evaluated based on a pencil hardness test, and pencil hardness was measured using an automatic type Mitsubishi Pencil Hardness Tester (QMESYS, QM450A). In particular, a pencil was placed according to KS G 2602 standards, the pencil was pressed against a surface of a steel sheet having a load of 1 kgf and used to scratch the surface at the same time, and then hardness thereof was measured by damage evaluation.

[Evaluation for Fouling Resistance, Chemical Resistance, and Processability]

Fouling resistance was evaluated, depending on the presence or absence of traces, when a line was drawn on and then erased from a surface of a manufactured product using a board marker. When a trace was completely erased without leaving any traces, "⊚" was marked; when a trace faintly remained, "Δ" was marked; and, when a trace was not erased, "x" was marked.

In evaluating chemical resistance, an acetone 95% solution was dropped to have 2 cm in droplet diameter on a surface of a manufactured product, and the product was covered with a cap and left for 2 hours, and the acetone solution was wiped off with a cloth. When the surface of the product was clean and undamaged, "⊚" was marked; when some of the coating film was damaged, "Δ" was marked; and, when an entire surface of the coating film was swollen or peeled, "x" was marked.

In addition, round processing was performed for the Inventive Example and the Comparative Examples to evaluate processability, and five (5) products were processed based on 800R. When 5 sheets were good without surface defects or damage, "⊚" was marked; when 4 sheets were good, "⊙" was marked; when 2 to 3 sheets were good, "Δ" was marked; and, when 1 or less sheet was good, "x" was marked.

[Evaluation of Optical Properties]

In order to compare color realization characteristics of the Inventive Example and the Comparative Examples, 882 sample colors were printed using a spectrophotometer, light in a 376.76 to 730 nm region was measured for color measurement, white point, color gamut volume, color density, and absolute values of gamut volume were evaluated according to the following evaluation method, and the results therefrom were illustrated in Table 1 below.

White Point Evaluation (White Point Comparison)

White point evaluation refers to an index indicating brightness of white. When an L value (Lightness) is greater than 75, "⊚" was marked; and when an L value is less than 50 to 75, "o" was marked.

Color Gamut Volume Evaluation (Gamut Volume, HSL Comparison)

Color gamut volume evaluation refers to an index indicating a color space region that each medium may reproduce in an outer line, which may be a region of entire sunlight. In a case that a HSL (H: Hue, S: Saturation, L: Lightness) value is evaluated for color gamut volume (Gamut Volume) (HSL Comparison), based on maximum saturation (Saturation=1), when a saturation reference value, to be actually reproduced, exceeds 440,000, "⊚" was marked; when a saturation reference value is between 350,000 and less than 440,000, "○" was marked; and, when a saturation reference value is less than 350,000, "Δ" was marked.

Color Density Evaluation ($D_{max}$ Comparison)

Color density represents a proportion of saturated state such as blackness or chroma. When a reference value is higher than 1.6, "⊚" was marked; when a reference value is 1.3 to less than 1.6, "○" was marked; and, when a reference value is less than 1.3, "Δ" was marked.

Absolute Value of Color Gamut Volume (Gamut Volume, Cubic Volume Comparison)

Absolute value of color gamut volume represents an index indicating a perceptible color space region in color gamut. In performing the evaluation, based on the absolute value of the color gamut volume, when a reference value exceeds 300,000, "⊚" was marked; when a reference value is 200,000 to less than 300,000, "○" was marked; and, when a reference value is less than 200,000, "Δ" was marked.

TABLE 1

|  |  | Inventive Example 400 μm Thin Glass-Laminated Printed Steel Sheet | Comparative Example 1 Thermal Curable High-Gloss Printed Steel Sheet | Comparative Example 2 5 mm Soda Lime Glass-Laminated Printed Steel Sheet |
|---|---|---|---|---|
|  | Glossiness | 97 | 87 | 96 |
| Image | SW | ⊚ (15) | × (56) | ⊚ (16) |
| Clarity | LW | ⊚ (4) | Δ (19) | ⊚ (4) |
|  | Pencil Hardness | 9H | H | 9H |
|  | Fouling Resistance | ⊚ | Δ | ⊚ |
|  | Chemical Resistance | ⊚ | Δ | ⊚ |
|  | Processability (800R Round Processing) | ○ | ⊚ | × |
| Evaluation for Optical Properties | White Point | ⊚ (76) | ⊚ (87) | ○ (53) |
|  | Gamut Volume (HSL) | ⊚ (445k) | ○ (426k) | ○ (423k) |
|  | Color Density ($D_{max}$) | ⊚ (1.69) | ⊚ (1.86) | ○ (1.57) |
|  | Absolute Values for Gamut Volume (Cubic Volume) | ○ (214k) | ⊚ (313k) | Δ (86k) |

From Table 1 above, it can be seen that the inventive example in which flat thin glass was attached to a surface thereof according to the present disclosure was able to obtain excellent gloss and image clarity, excellent hardness and processability, and good optical properties. In Comparative Example 1, optical properties and processability were good, but there was a limit to realization of gloss or image clarity due to solvent volatilization of the thermal curing system. In addition, hardness was low, compared to the Inventive Example, which glass was laminated, or Comparative Example 2, and fouling resistance and chemical resistance were inferior. In addition, in Comparative Example 2, it was confirmed that, since glass was laminated, glossiness, image clarity, hardness, fouling resistance, and chemical resistance were excellent on levels of the present disclosure, but since a thickness of the laminated glass was too thick, optical properties related to color reproducibility, such as white point, color gamut volume, color density, absolute value of color gamut volume, and the like were inferior, as compared to the present disclosure, and processability was also inferior.

While example embodiments have been shown and described above, it will be apparent to those skilled in the art that modified embodiments and variations could be made without departing from the scope of the present disclosure as defined by the appended claims.

DESCRIPTIONS OF REFERENCE NUMERALS

1 PRINTED STELL SHEET
11 METAL SHEET
12 PRINTED LAYER
2 ADHESIVE LAYER
3 THIN GLASS
4 BASE COLOR LAYER
5 PRIMER LAYER
6 PRETREATMENT LAYER

The invention claimed is:

1. A glass-laminated printed steel sheet comprising:
   a printed steel sheet including a metal sheet and a printed layer on which a design or a pattern is printed on a surface of the metal sheet;
   an adhesive layer formed by curing an ultraviolet curable adhesive solution on the printed steel sheet, the adhesive layer having a thickness of 10 to 100 μm and being transparent; and
   flexible glass attached by the adhesive layer, the flexible glass having a thickness of 0.1 to 2 mm,
   wherein a reference value for color density ($D_{max}$ Comparison) is higher than 1.6, as measured by a spectrophotometer,
   wherein glossiness of the glass-laminated printed steel sheet is 85% or more, based on a 60 degree glossmeter,
   wherein image clarity of the glass-laminated printed steel sheet is SW 30 or less and LW 10 or less, based on an image clarity measuring instrument, and
   wherein, in evaluating optical properties by the spectrophotometer, an L value is greater than 75, when white point is evaluated (White Point Comparison), a reference value is greater than 440,000, when a HSL (H: Hue, S: Saturation, L: Lightness) value is evaluated for color gamut volume (Gamut Volume) (HSL Comparison), based on maximum saturation (Saturation=1), and a reference value is greater than 200,000, when an absolute value of color gamut volume is evaluated (Cubic Volume Comparison).

2. The glass-laminated printed steel sheet of claim 1, wherein the flexible glass is non-alkali borosilicate glass, soda lime glass, or tempered glass.

3. The glass-laminated printed steel sheet of claim 1, wherein the printed steel sheet further comprises at least one or more of a base color layer or a primer layer, between the metal sheet and the printed layer.

4. The glass-laminated printed steel sheet of claim 3, wherein a pretreatment layer is further included between the metal sheet and the primer layer.

5. The glass-laminated printed steel sheet of claim 1, wherein the printed steel sheet is an inkjet-printed steel sheet.

6. The glass-laminated printed steel sheet of claim 1, wherein resolution of the design or the pattern printed on the printed layer is 300 dpi or higher.

7. A method for manufacturing the thin glass-laminated printed steel sheet according to claim 1, comprising:
preparing a printed steel sheet including a metal sheet and a printed layer on which a design or a pattern is printed on a surface of the metal sheet;
applying an ultraviolet curable adhesive solution to a surface of the prepared printed steel sheet to form an adhesive layer;
attaching flexible thin glass to the prepared printed steel sheet to which the ultraviolet curable adhesive solution is applied;
applying pressure to the attached flexible thin glass; and
irradiating ultraviolet rays to cure the ultraviolet curable adhesive solution.

8. The method of claim 7, wherein a thickness of the flexible thin glass is 0.1 to 2 mm.

9. The method of claim 7, wherein the pressure is 2 to 10 kgf.

10. The method of claim 7, wherein a thickness of the adhesive layer, after curing the ultraviolet curable adhesive solution, is 10 to 100 μm.

11. The method of claim 7, wherein the ultraviolet curable adhesive solution comprises a polyester acrylate oligomer having six or more functional groups, a urethane acrylate oligomer having two functional groups, at least one photocurable monomer, and a photoinitiator.

12. The method of claim 7, wherein resolution of the design or the pattern printed on the printed layer is 300 dpi or more.

13. A system for manufacturing the thin glass-laminated printed steel sheet according to claim 1, comprising:
a coating means coating an ultraviolet curable adhesive solution on a printed steel sheet;
a glass attaching means installed on a rear end of the coating means and attaching flexible thin glass onto the adhesive solution;
a pressing means connected to the glass attaching means and compressing the flexible thin glass to make the glass attaching means and the flexible thin glass in close contact with each other; and
a curing means installed on a rear end of the pressing means and irradiating ultraviolet rays to cure the ultraviolet curable adhesive solution to form a coating film.

14. The system of claim 13, further comprising a decompression means decompressing the thin glass-laminated printed steel sheet to remove microbubbles in an edge portion of the thin glass-laminated printed steel sheet.

* * * * *